(12) United States Patent
Sabelfeld et al.

(10) Patent No.: US 12,046,964 B2
(45) Date of Patent: Jul. 23, 2024

(54) STATOR FOR A ROTATING ELECTRICAL MACHINE

(71) Applicant: Innomotics GmbH, Nuremberg (DE)

(72) Inventors: Ilja Sabelfeld, Bern (CH); Matthias Centner, Berlin (DE)

(73) Assignee: Innomotics GmbH, Nuremberg (DE)

( * ) Notice: Subject to any disclaimer, the term of this patent is extended or adjusted under 35 U.S.C. 154(b) by 302 days.

(21) Appl. No.: 17/616,928

(22) PCT Filed: May 29, 2020

(86) PCT No.: PCT/EP2020/065032
§ 371 (c)(1),
(2) Date: Dec. 6, 2021

(87) PCT Pub. No.: WO2020/245051
PCT Pub. Date: Dec. 10, 2020

(65) Prior Publication Data
US 2022/0345012 A1    Oct. 27, 2022

(30) Foreign Application Priority Data
Jun. 7, 2019 (EP) ..................... 19179050

(51) Int. Cl.
*H02K 1/16* (2006.01)
*H02K 3/12* (2006.01)
(Continued)

(52) U.S. Cl.
CPC ............. *H02K 15/063* (2013.01); *H02K 1/16* (2013.01); *H02K 3/12* (2013.01); *H02K 3/28* (2013.01); *H02K 2213/03* (2013.01)

(58) Field of Classification Search
CPC .................................. H02K 1/16; H02K 3/12
(Continued)

(56) References Cited

U.S. PATENT DOCUMENTS

| | | | |
|---|---|---|---|
| 2,403,118 A * | 7/1946 | Pollard ..................... | H02K 3/12 310/213 |
| 5,789,840 A | 8/1998 | Gould et al. | |

(Continued)

FOREIGN PATENT DOCUMENTS

| | | |
|---|---|---|
| CN | 102842970 A | 12/2012 |
| CN | 104124789 A | 10/2014 |

(Continued)

OTHER PUBLICATIONS

PCT International Examination Report and Written Opinion of International Examination Authority mailed Jul. 16, 2020 corresponding to PCT International Application No. PCT/EP2020/065032 filed May 29, 2020.

*Primary Examiner* — Alexander Talpalatski
(74) *Attorney, Agent, or Firm* — Henry M. Feiereisen LLC (57) ABSTRACT

A stator for a rotating electric machine includes a laminated core, and an electrically conductive winding including a winding top layer with electrically conductive top bars, and a winding bottom layer with electrically conductive bottom bars. Each groove of a stator segment of the laminated core has arranged therein a top bar and a bottom bar in adjacent relationship. The top and bottom bars protrude out of the grooves. A connecting element connects a free end of a top bar to a free end of a bottom bar of an adjacent stator segment and includes an inclined section to connect two ends of the connecting element. The ends are angled relative to the inclined section. One end of the connecting element is connected to the free end of the bottom bar and the other end of the connecting element is connected to the free end of the top bar.

14 Claims, 4 Drawing Sheets

(51) Int. Cl.
*H02K 3/28* (2006.01)
*H02K 15/06* (2006.01)

(58) Field of Classification Search
USPC ........................................................ 310/179
See application file for complete search history.

(56) References Cited

U.S. PATENT DOCUMENTS

| | | | | |
|---|---|---|---|---|
| 6,791,227 | B2* | 9/2004 | Yasuhara | ................ H02K 3/12 |
| | | | | 310/260 |
| 6,969,939 | B1 | 11/2005 | Swensrud et al. | |
| 8,093,777 | B2* | 1/2012 | Stiesdal | ................... H02K 3/12 |
| | | | | 310/260 |
| 8,779,642 | B2* | 7/2014 | Matsuyama | ............. H02K 3/52 |
| | | | | 310/43 |
| 10,122,234 | B2* | 11/2018 | Kaneshige | ............... H02K 3/12 |
| 10,574,106 | B2* | 2/2020 | Takei | ....................... H02K 1/04 |
| 2002/0117928 | A1 | 8/2002 | Yasuhara et al. | |
| 2009/0096313 | A1* | 4/2009 | Harada | ................. H02K 3/522 |
| | | | | 977/932 |
| 2011/0304237 | A1 | 12/2011 | Stiesdal | |
| 2012/0326552 | A1 | 12/2012 | Kinpara et al. | |
| 2014/0319960 | A1 | 10/2014 | Iki | |
| 2015/0380991 | A1 | 12/2015 | Brasas et al. | |
| 2017/0025907 | A1 | 1/2017 | Iki | |
| 2017/0141636 | A1 | 5/2017 | Iki | |

FOREIGN PATENT DOCUMENTS

| | | |
|---|---|---|
| CN | 104995819 A | 10/2015 |
| CN | 106104977 A | 11/2016 |
| CN | 106130213 A | 11/2016 |
| EP | 2395632 A1 | 12/2011 |
| EP | 3086442 A1 | 10/2016 |
| EP | 3118973 A1 | 1/2017 |
| JP | 3474660 B2 | 12/2003 |
| RU | 2226026 C2 | 3/2004 |
| WO | WO 2015151615 A1 | 10/2015 |

* cited by examiner

FIG 8

STATOR FOR A ROTATING ELECTRICAL MACHINE

CROSS-REFERENCES TO RELATED APPLICATIONS

This application is the U.S. National Stage of International Application No. PCT/EP2020/065032, filed May 29, 2020, which designated the United States and has been published as International Publication No. WO 2020/245051 A1 and which claims the priority of European Patent Application, Serial No. 19179050.0, filed Jun. 7, 2019, pursuant to 35 U.S.C. 119(a)-(d).

BACKGROUND OF THE INVENTION

The invention relates to a stator for a rotating electric machine. The invention relates furthermore to a rotating electric machine having such a stator and to a method for assembling a stator of this type.

Stators are known from the prior art as a component of rotating electric machines. An electrically conductive winding of a stator of a rotating electric machine is frequently designed as a so-called double-layer winding. Double-layer winding is understood to mean a three phase winding that is guided in two layers along each groove of a so-called laminated stator core, wherein a so-called winding bottom layer extends on the groove bottom side along each groove and a so-called winding top layer of the stator winding extends on the groove opening side.

The three phase winding is designed either as a so-called coil winding or as a so-called bar winding. For example, a double-layer bar winding has so-called Roebel rods that respectively have only one conductor having multiple, twisted sub-conductors that are connected in parallel to one another and said Roebel rods extend in the winding bottom layer or winding top layer along a groove. A double-layer bar winding therefore has a number of conductors equal to two.

When electric motors have a large laminated stator core external diameter, for example larger than 5 m, it can be necessary for various reasons to segment the laminated stator core. For example, segmentation is necessary if a size and weight of the electric motor exceed an existing crane capacity. Furthermore, segmentation can be necessary if the amount of space required by a one-piece stator in an impregnation trough of a so-called VPI system (vacuum pressure impregnation) in which a process step for producing a high voltage insulation is performed is too large or the stator can only be transported in a segmented form. The individual stator segments can be subsequently assembled at a site where the electrically rotating machine is used.

The segmentation of the stator necessarily requires the winding to be segmented. However, in the case of a double-layer coil winding this represents a problem with respect to segment-overlapping winding elements, since in so doing bar end faces protrude in particular in a tangential manner over a longitudinal side of a stator segment, which prevents the stator segments being guided one inside the other in an axial form with the result that in particular heavy stator segments can only be assembled with great difficulty.

EP 3 118 973 A1 discloses a rotating electric machine that comprises a stator and a rotor. The stator has coil slots that are arranged in a stator iron core and a coil winding that is designed as a double-layer winding and is arranged in the coil slots. The coil winding comprises multiple coils having respectively a bottom coil, which is arranged on an external circumferential side in the coil slots, and a top coil, which is arranged on an internal circumferential side in the coil slots. The bottom and the top coils are in this case bent at the end in a radial direction, wherein a spacing from the bent end region of the top coil to the coil slot side is longer than a spacing from the bent end region of the bottom coil to the coil slot side.

A mechanical and electrical connection of two separate stator windings is known from U.S. Pat. No. 6,969,939 B1. Mechanical and electrical connectors which receive winding ends are provided for this purpose.

A stator of a dynamo-electric machine that has special connectors for protruding ends of elements of the winding is known from U.S. Pat. No. 5,789,840. In this case, the protruding end has only one bend.

The object of the invention is to provide a stator that is improved with regard to the prior art, a rotating electric machine and a method for assembling a stator of this type.

SUMMARY OF THE INVENTION

With respect to the stator, the object is achieved in accordance with the invention as set forth hereinafter. With respect to the rotating electric machine, the object is achieved in accordance with the invention as set forth hereinafter. With respect to the method, the object is achieved in accordance with the invention as set forth hereinafter.

Advantageous embodiments of the invention are the subject matter of the subclaims.

A stator in accordance with the invention for a rotating electric machine comprises a laminated core that has a plurality of mutually connected stator segments, which respectively extend from a first end face to a second end face of the laminated core that lies opposite the first end face, and an electrically conductive winding that is designed as a double-layer bar winding and has a winding top layer and a winding bottom layer. The winding top layer comprises a plurality of electrically conductive top bars. The winding bottom layer comprises a plurality of electrically conductive bottom bars. In this case, each stator segment has a plurality of grooves that extend in an axial direction, wherein a top bar and a bottom bar are arranged adjacent to one another in a radial direction in each groove, in particular said bars are arranged one above the other separated by means of a spacer and said bars protrude on each end face of the laminated core with respectively an end face region out of the groove in an axial direction, and wherein at least one top bar of a stator segment is electrically conductively connected to a bottom bar of an adjacent stator segment by means of a connecting element. The connecting element is connected to the top bar and/or the bottom bar of the adjacent stator segment in particular by means of a bonded connection and/or a non-positive locking connection. This can relate to an electrical and/or mechanical connection.

The stator that is designed in such a manner renders it possible to construct large electric rotating machines with axial lengths that are longer in comparison to conventional machines. This is in particular based on the configuration of the winding, wherein respectively a top bar and a bottom bar protrude out of the groove in an axial direction. Consequently, the winding can be likewise segmented according to a number of the stator segments without in so doing winding elements, i.e. top bar and/or bottom bar, protruding over longitudinal sides of the individual stator segments that extend parallel to a longitudinal axis of the stator.

As a result of this, the stator segments can be provided with a winding section prior to being assembled, wherein top and bottom bars in a segment-overlapping region, in other words in a region at and close to a join site, are not yet electrically conductively connected by means of a connecting element. This renders it possible that the winding or the winding sections do not protrude over the longitudinal side of the corresponding stator segment with the result that it is possible to assemble the stator segments in a simple and reliable manner.

The top and bottom bars that are not arranged in a segment-overlapping area are electrically conductively connected to one another by means of the connecting element prior to the assembly of the stator segments, wherein in so doing top and bottom bars, which are arranged in the same stator segment, are electrically conductively connected to one another. The stator segments that are provided with winding segments can be subsequently soaked in an insulating bath and thus impregnated. Consequently, the segmented stator renders possible a fully-impregnated insulated winding.

In one embodiment of the stator, the free end of the top bar is spaced from the free end of the bottom bar that is offset with respect to said top bar in the circumferential direction.

In one embodiment of the stator, the connecting elements are of the same material as the bottom bars and/or the top bars. It is thus possible to reduce thermal stresses. The material is in particular copper or a copper alloy.

One embodiment of the invention provides that a connecting element, in particular each connecting element, electrically conductively connects a free end of a top bar to a free end of a bottom bar that is offset with respect to this top bar in the circumferential direction.

In one possible embodiment, the connecting element, in particular each connecting element, has an inclined section which connects to one another at least one, in particular two ends that are angled with respect to this one end, wherein the one end of the connecting element, in particular each connecting element, is electrically conductively connected to the free end of a bottom bar and/or the other end of each connecting element is electrically conductively connected to the free end of a top bar. The connecting element that is designed in this manner renders it possible to electrically conductively connect the top bar and the bottom bar on a shortest possible path. For example, the connecting element is designed as a connecting bracket, whereby this can be connected to the top bar and bottom bar in a simple and mechanically stable manner. This advantageously also results in a simple electrical connection of the top and the bottom bars in the segment-overlapping region after the stator segments have been assembled.

In one embodiment, the connecting element, which is in particular preformed, is designed in such a manner that it connects the top bar to the bottom bar in an electrical and mechanical manner, wherein the end of the top bar and the end of the bottom bar are offset in other words offset by an angle in the circumferential direction, and/or the end of the top bar and the end of the bottom bar terminate at different positions in an axial longitudinal direction of the electric machine (relates to its axis of rotation). These bars, in other words the top bars and the bottom bars, are designed in particular differently to one another, in particular in an asymmetrical manner and in particular also prefabricated.

In one embodiment of the connecting element, the inclined section is at least twice as long as at least one angled end. It is thus possible to compensate thermal stresses.

In one embodiment of the connecting element, the angled ends of the connecting element span planes, wherein these planes extend in a parallel manner.

In one embodiment of the connecting element, the angled ends of the connecting element span planes that in the installed state of the connecting element run into the stator through the axis of rotation of the rotor that is assigned to the stator.

In the case of one possible embodiment of the winding, the end face region of each top bar is designed extending in a straight line in an axial direction on at least one end face of the laminated core and the end face region of each bottom bar is designed bent twice, wherein the free end of each top bar and of each bottom bar protrude in an axial direction. In particular, all the top bars and bottom bars protrude on the at least one end face out of the grooves in an axial direction to the same extent. As a consequence, the bar ends of the top and bottom bars lie in a common plane with the result that the connection can be created in a very simple manner by means of a connecting element.

In the case of another possible embodiment of the winding, the end face region of each top bar and the end face region of each bottom bar are designed bent once on at least one end face of the laminated core, wherein the free end of each top bar and each bottom bar protrude in a radial direction. In particular, the top bars protrude on the at least one end face in an axial direction further out of the grooves than the bottom bars.

A further embodiment of the invention provides that each two adjacent stator segments are connected to one another in a positive-locking and non-positive locking manner by means of a tongue and groove connection. In the case of a tongue and groove connection, in particular a join is provided on a longitudinal side of a stator segment and a peg which is arranged on a longitudinal side of the adjacent stator segments engages in a positive-locking manner in said join. Such a connection renders it possible not only to slide the stator segments one inside the other in a simple positive-locking manner but rather also renders possible a mechanically stable connection on account of a sufficiently high shear strength, said mechanically stable connection having in a known manner a peg in a tongue and groove connection.

A rotating electric machine in accordance with the invention has a stator in accordance with the invention. The advantages of a rotating electric machine of this type arise from the above mentioned advantages of the stator in accordance with the invention.

In the case of a method in accordance with the invention for assembling a stator in accordance with the invention, a top bar and a bottom bar are arranged in each groove of each stator segment. Each top bar is connected by means of a connecting element to a bottom bar that is assigned to said top bar insofar as the top bar and the bottom bar are arranged in grooves of the same stator segment. Subsequently, each stator segment having the top bars and bottom bars, which are arranged in the grooves of said stator segment, and the connecting elements, which respectively connect a top bar and a bottom bar of the stator segment, is impregnated and thus insulated. The impregnated stator segments are then connected to one another in a positive-locking or non-positive locking manner. After the impregnated stator segments have been connected, at least one top bar of a stator segment is electrically conductively connected to a bottom bar of an adjacent stator segment by means of a connecting element.

The method renders it possible to assemble the stator in a simple manner with a variable number of stator segments, in particular at a site where the rotating electric machine is used, since the winding is designed in such a manner that all the grooves are filled with winding elements prior to impregnating, Consequently, the method can also be used for very large machines having many stator segments.

In one embodiment of the method, each connecting element is connected to the free end of a top bar and the free end of a bottom bar, in particular soldered. This renders possible a cost-effective, mechanically stable and electrically conductive connection.

A further embodiment of the method provides that for each connecting element that connects a top bar and a bottom bar of two adjacent stator segments a connecting region between the connecting element and the top bar and a connecting region between the connecting element and the bottom bar are electrically insulated. The method consequently renders possible an almost fully-soaked impregnation of the winding since only connecting sites of the connecting elements that are arranged after the impregnated stator segments have been connected are individually insulated. Since in so doing only a small part of the winding is insulated retrospectively, it is possible to reduce the assembly outlay with regard to conventional stators in which for example each winding segment is individually insulated.

In one embodiment of the method, a stator of the type described is manufactured or a connecting piece of the type described is used for the manufacture or assembly.

BRIEF DESCRIPTION OF THE DRAWING

The above described characteristics, features and advantages of this invention and the manner in which these are realized are more clearly and more precisely understandable in conjunction with the following description of the exemplary embodiments that are explained in more detail in conjunction with the drawings. In the drawings.

DETAILED DESCRIPTION OF PREFERRED EMBODIMENTS

Mutually corresponding parts are provided in all the figures with identical reference characters.

Figure 1:
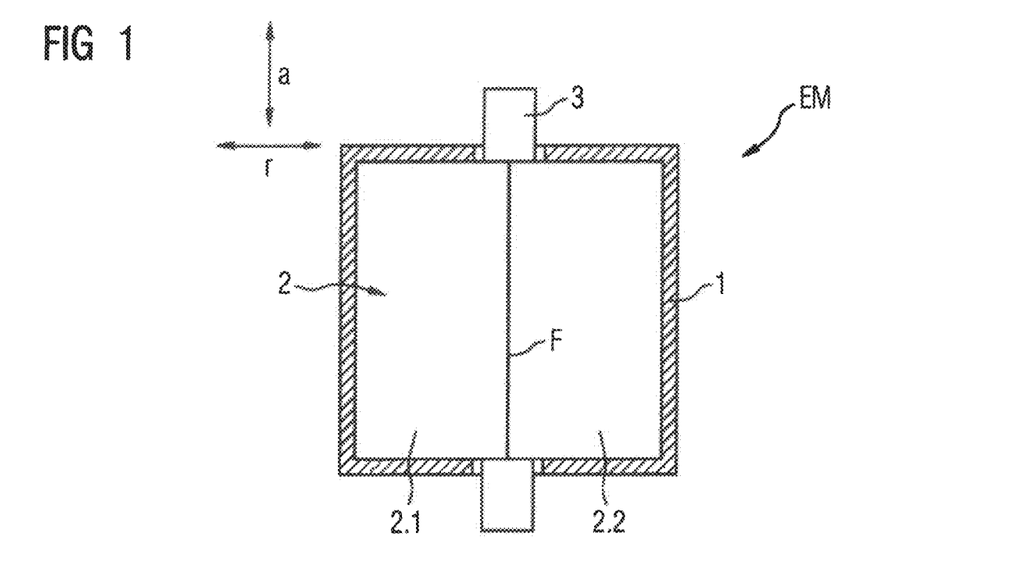
FIG. 1 shows schematically a side view of a rotating electric machine.

FIG. 1 shows schematically a side view of a rotating electric machine EM in a simplified view.

The rotating electric machine EM is for example a synchronous motor and comprises a housing 1 in which a stator 2 is arranged in a non-rotatable manner with respect to the housing 1, The stator 2 comprises multiple stator segments 2.1, 2.2, that are respectively designed as a laminated core and so as to form a hollow cylindrical stator 2 are connected to one another at join sites F, wherein the join sites F extend in an axial direction a. In this case, the number of stator segments 2.1, 2.2 (two stator segments 2.1, 2.2 are shown in the illustrated exemplary embodiment) can vary depending on a site where the rotating electric machine is used.

The rotating electric machine EM comprises furthermore (not shown in more detail) a rotor with a rotor shaft 3, wherein the rotor is rotatably mounted with respect to the stator 2 in the housing 1. In the illustrated exemplary embodiment, the rotor is encompassed by the stator 2, wherein an air gap is arranged between the stator 2 and the rotor. Alternatively, the rotating electric machine EM can also be designed in such a manner that the rotor encompasses the stator 2.

Figure 2:
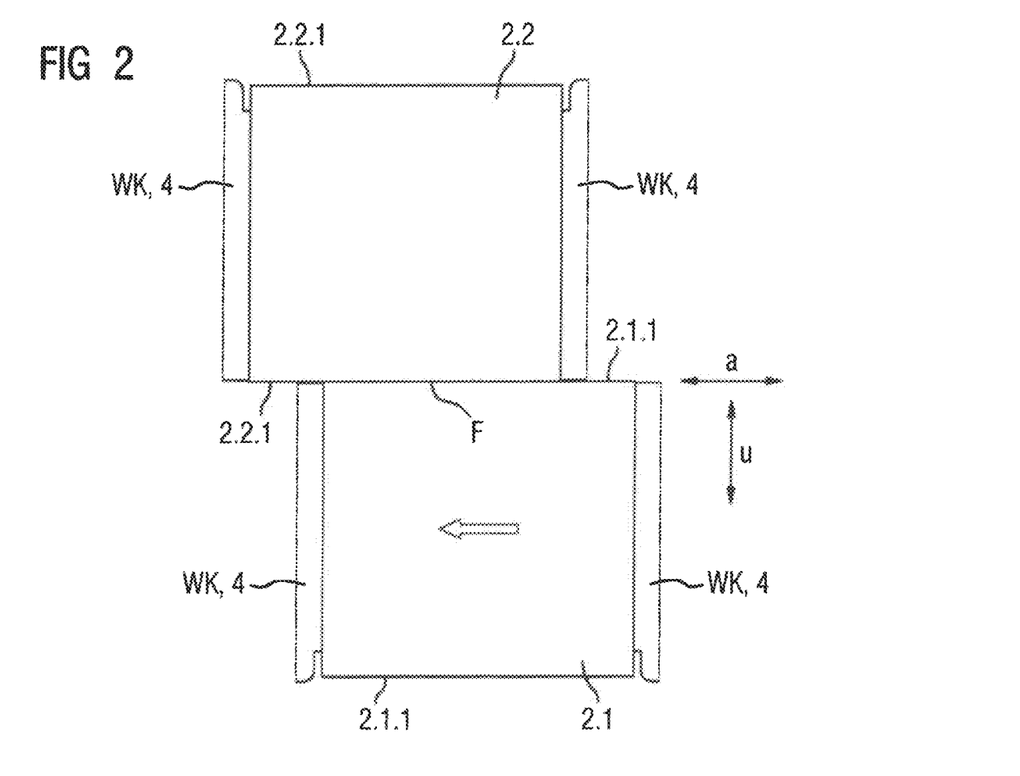
FIG. 2 shows schematically in a side view two stator segments during the assembly.

FIG. 2 shows schematically in a side view two stator segments 2.1, 2.2 during the assembly.

The stator 2 is designed as a carrier of an electrically conductive winding 4 that in the illustrated exemplary embodiment comprises two winding heads WK that protrude at the end face out of the stator segments 2.1, 2.2. So as to receive the electric winding 4, the stator segments 2.1, 2.2 respectively have a plurality of grooves 5 (cf. FIG. 3), which are also known as laminated core grooves and are described in more detail in FIG. 3.

So as to connect the illustrated stator segments 2.1, 2.2, a longitudinal side 2.1.1 of a stator segment 2.1 has a (not shown in more detail) join, which is provided so as to produce a positive-locking and non-positive locking connection, in particular a tongue and groove connection, to the other stator segment 2.2. A longitudinal side 2.2.1 of the other stator segment 2.2 has in addition a (not shown in more detail) peg that engages in a positive-locking manner in the join.

As the present exemplary embodiment illustrates, the stator segments 2.1, 2.2 are connected to one another in a positive-locking and non-positive locking manner by sliding the longitudinal sides 2.1.1, 2.2.1 one inside the other in an axial direction a. Further fastening elements (not illustrated) can be provided so as to fix the tongue and groove connection.

Figure 3:
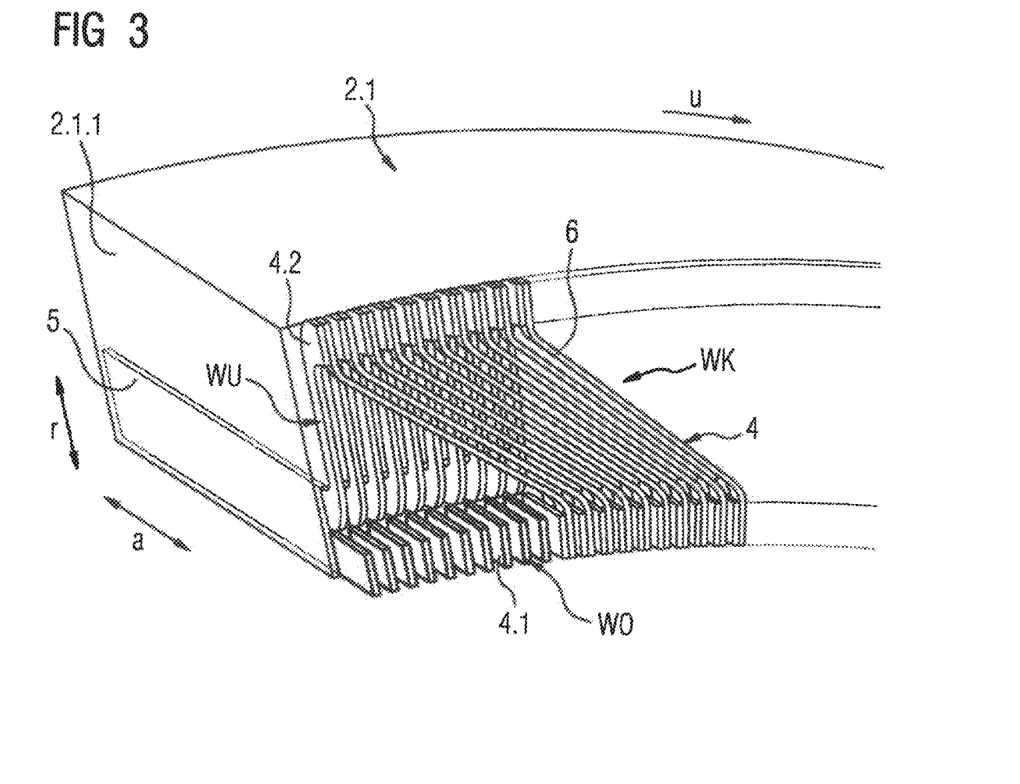
FIG. 3 shows schematically a perspective part view of a stator segment having a double-layer bar winding in a first embodiment.

The segmentation of the stator 2 renders it possible to construct large electric machines with long laminated core lengths. For example, prior to the assembly of the stator 2, the individual stator segments 2.1, 2.2 are provided with the winding 4 and subsequently impregnated with the result that hollow spaces in the winding 4 are closed with an insulating material and sealed. The individual stator segments 2.1, 2.2 that are provided with the winding 4 can then be assembled as described above at a site where the rotating electric machine EM is used. So that this is possible in a simple manner, a winding 4 is proposed that renders it possible to slide the stator segments 2.1, 2.2 one inside the other in an axial manner, Two possible embodiments of such a winding 4 are described below, FIG. 3 shows schematically a perspective part view of a stator segment 2.1 having the winding 4 in a first embodiment.

The winding 4 is a double-layer bar winding and comprises a winding top layer WO and a winding bottom layer WU. The winding top layer WO comprises a plurality of electrically conductive top bars 4.1 and the winding bottom layer WU comprises a plurality of electrically conductive bottom bars 4.2. The top bars 4.1 and the bottom bars 4.2 respectively have in a manner not shown in more detail sub-conductors that are arranged parallel to one another and comprise for example insulated copper and in a groove side region NB and in an end face region SB (cf. FIG. 4) are designed in a twisted manner with respect to one another or extending parallel to one another and thus without being twisted.

The top and bottom bars 4.1 and 4.2 are arranged in the grooves 5 of the stator segment 2.1, wherein a top bar 4.1 and a bottom bar 4.2 are arranged in respectively one groove 5. In particular, the top bar 4.1 and the bottom bar 4.2 are arranged in each groove 5 in a radial direction r separated by a spacer and one above the other. The grooves 5 are provided in an inner casing surface of the stator segments 2.1, 2.2 and are arranged adjacent to one another along a circumferential direction u. In this case, the grooves 5 each extend in an axial direction a from an end face of the stator segment 2.1 to the opposite-lying end face of the stator segment 2.2. In the illustrated exemplary embodiment, one of the grooves 5 is indicated by broken lines. At the end faces, the top and bottom bars 4.1, 4.2 respectively protrude out of the groove 5 in an axial direction a and in this case form the winding heads WK that are shown in FIG. 2.

Furthermore, the top and bottom bars 4.1, 4.2 respectively are electrically conductively connected to one another by means of a connecting element 6. In this case, the connecting element 6 connects a top bar 4.1 to a bottom bar 4.2 that is offset with respect to said top bar in a circumferential direction u, as is illustrated in the present exemplary embodiment. The connecting element 6 is designed in a bracket-shaped manner and it extends in a tangential manner with respect to the circumferential direction u on account of the top and bottom bars 4.1, 4.2, which are to be connected to one another, being offset.

The top bars 4.1, which are arranged in a region of a segment boundary of the stator segment 2.1, i.e. in a region at and close to the longitudinal side 2.1.1, are not connected to a connecting element 6 in an unassembled state since these are provided respectively for electrical connection to a bottom bar 4.2 of the other stator segment 2.2. These top and bottom bars 4.1, 4.2 are only electrically conductively connected to one another by means of the connecting element 6 after the stator segments 2.1, 2.2 have been assembled, as is illustrated in an exemplary manner in FIG. 5. This renders possible a simple connection of the stator segments 2.1, 2.2 in an axial direction a since the winding head WK does not protrude over the longitudinal side 2.1.1.

Figure 4:
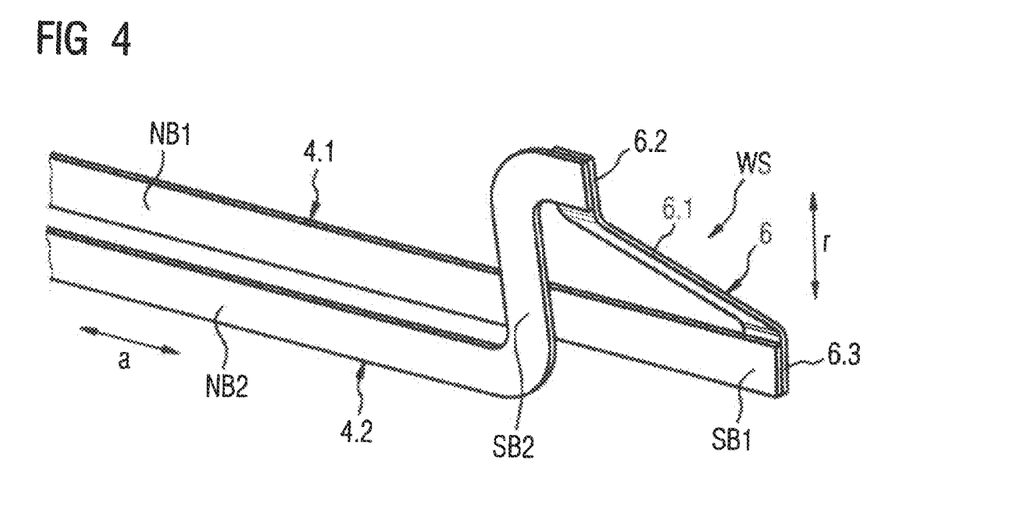
FIG. 4 shows schematically a perspective view of a winding segment of the double-layer bar winding in accordance with the first embodiment.

FIG. 4 shows schematically a perspective view of a winding segment WS in accordance with the first embodiment.

The winding segment WS comprises a top bar 4.1, a bottom bar 4.2 and a connecting element 6.

In the first embodiment, a groove region NB1 and an end face region SB1 of the top bar 4.1 respectively are designed in a straight manner. The groove region NB1 is the region of the top bar 4.1 that is arranged within the groove 5. The end face region SB1 protrudes out of the groove 5 and is a component of the winding head WK. In particular, the end face region SB1 protrudes in an axial direction a out of the groove 5, as is illustrated in FIG. 3. Consequently, the entire top bar 4.1 extends in an axial direction a.

A groove region NB2 of the bottom bar 4.2 is likewise straight. The bottom bar 4.2 protrudes in an axial direction a out of the groove 5 but has a double-bent end face region SB2. As a consequence, the end face region SB2 is divided into three regions that are angled with respect to one another.

A first region that protrudes directly out of the groove 5 extends in an axial direction a, a second region is angled with respect to the first region and extends in a radial direction r. The end face region SB2 is in this case consequently bent outwards in a radial direction. A third region is angled from the second region and also extends in an axial direction a. The third region comprises a free end of the bottom bar 4.2. The free end of the bottom bar 4.2 is in this case arranged in an axial direction a in the same plane as a free end of the top bar 4.1. In other words: The top bar 4.1 and the bottom bar 4.2 have the same axial length.

The connecting element 6 comprises a metal or a metal alloy, for example solid copper. As already mentioned, the connecting element 6 is designed in a bracket-shaped manner. In this case, the connecting element 6 comprises a ramp-shaped inclined section 6.1 that connects two ends 6.2, 6.3 to one another, said ends being angled with respect to said ramp-shaped inclined section. The connecting element 6 is in particular preformed in this case also as in other embodiments. The connecting element connects two bars, the top bar 4.1 to the bottom bar 4.2. These bars are designed for example differently to one another, in particular in an asymmetrical manner and in particular also prefabricated. This relates to these bars and also other winding bars in the further examples.

In this case, an end 6.2 of the connecting element 6 extends outwards in a radial direction r in the assembled state of the stator 2 (cf. FIG. 3). In particular, in so doing, a side face of the end 6.2 lies against a side face of the free end of the bottom bar 4.2. Another end 6.3 of the connecting element 6 extends inwards in a radial direction r in the assembled state of the stator 2 (cf. FIG. 3). In particular, in so doing, a side face of the end 6.3 lies against a side face of the free end of the top bar 4.1.

The inclined section 6.1 extends in the assembled state of the stator 2 starting from the one end 6.2 inwards in a radial direction, however, in this case in a tangential manner with respect to the circumferential direction u (cf. FIG. 3). The top and bottom bars 4.1, 4.2 that are offset with respect to one another in the circumferential direction u can be respectively electrically conductively connected to one another on a shortest possible path by means of the connecting element 6 that is designed with the inclined section 6.1.

The ends 6.2, 6.3 of the connecting element 6 can be soldered to the free ends of the top bar 4.1 and the bottom bar 4.2 respectively or can be connected to one another by means of another electrically conductive connection.

Figure 5:
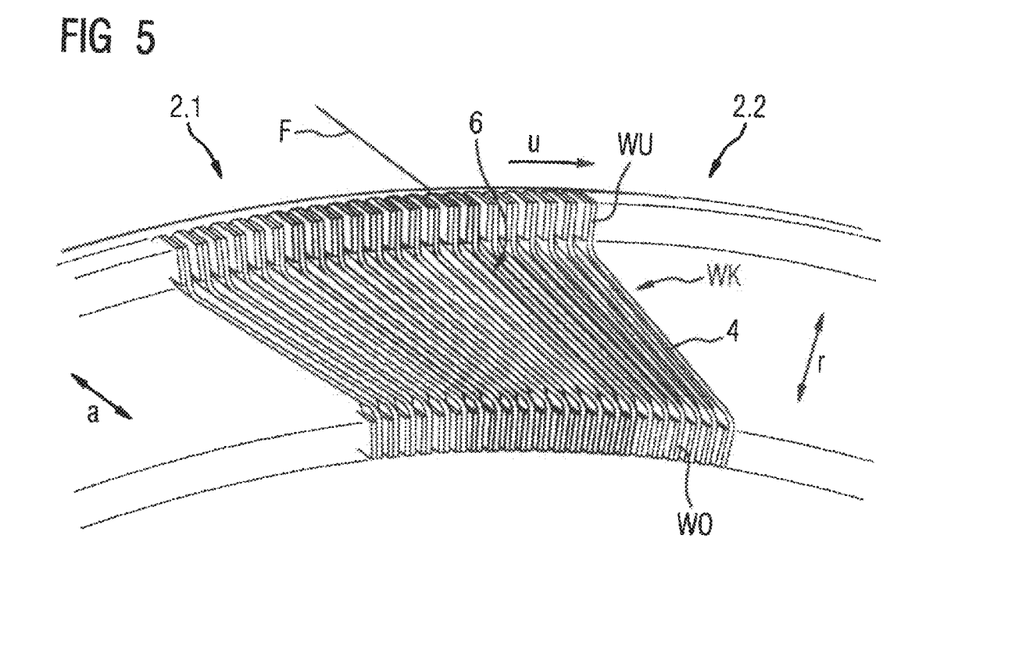
FIG. 5 shows schematically a perspective part view of two mutually connected stator segments having the double-layer bar winding in accordance with the first embodiment.

FIG. 5 shows schematically a perspective part view of two mutually connected stator segments 2.1, 2.2 having the winding 4 in accordance with the first embodiment.

The illustrated stator segments 2.1, 2.2 are connected to one another at the join site F and comprise the winding 4 that now in addition also comprises the connecting elements 6 that electrically conductively connect the top bars 4.1 of the one stator segment 2.1 to the bottom bars 4.2 of the other stator segment 2.2. These connecting elements 6 are only arranged after the stator segments 2.1, 2.2 have been assembled, in other words for example at a site where the rotating electric machine EM is used, and connected to the corresponding top and bottom bars 4.1, 4.2. Connecting sites between the connecting elements 6 and the top and bottom bars 4.1, 42 are electrically insulated in a known manner.

It is also possible that the top bars 4.1, which do not lie against the segment boundary, and the connecting elements 6 that are assigned accordingly are designed as one piece, in that in the end face region the top bar 4.1 is bent outwards in a radial direction by 90 degrees and is shaped in the further course in a corresponding manner to the connecting element 6. It is thus possible to reduce the number of connecting sites.

Figure 6:
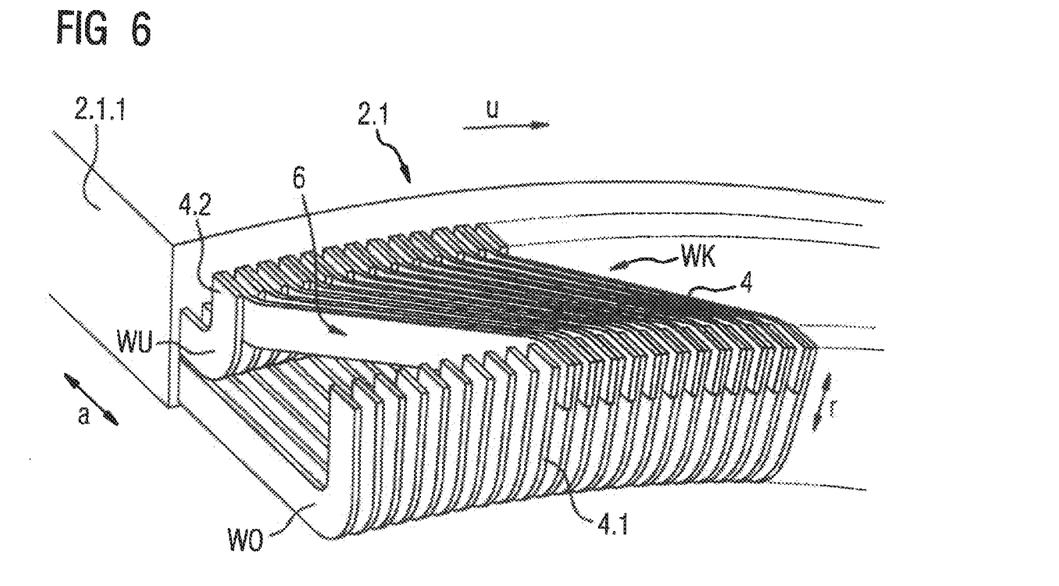
FIG. 6 shows schematically a perspective part view of a stator segment having a double-layer bar winding in a second embodiment.
Figure 7:
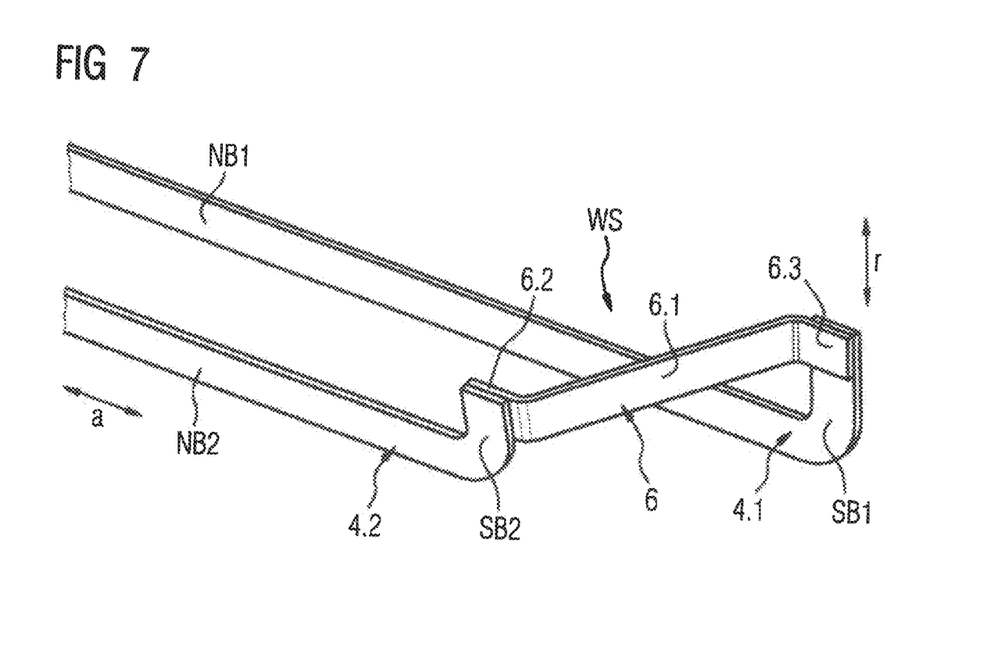
FIG. 7 shows schematically a perspective view of a winding segment of the double-layer bar winding in accordance with the second embodiment.

FIG. 6 shows schematically a perspective part view of a stator segment 2.1 having a winding 4 in accordance with a second embodiment. FIG. 7 shows schematically a perspective individual view of a winding segment WS in accordance with the second embodiment.

The winding 4 is in so doing likewise a double-layer bar winding and comprises the winding top layer WO and the winding bottom layer WU in accordance with the description of FIG. 3.

In the second embodiment, the groove regions NB1, NB2 of the top bars 4.1 and the bottom bars 4.2 are each designed in a straight manner and extend in an axial direction a. The end face regions SB1, SB2 of the top bars 4.1 and the bottom bars 4.2 respectively are bent once, in particular they are bent outwards in a radial direction. As a consequence, the end face regions SB1, SB2 are each divided into two regions that are angled with respect to one another.

A first region that protrudes directly out of the groove 5 extends in an axial direction a. A second region is angled with respect to the first region and extends upwards in a radial direction r. The second region comprises the free end of the top bar 4.1 or of the bottom bar 4.2, However, in so doing, the top bar 4.1 and the bottom bar 4.2 have different axial lengths. An axial offset of the free ends is dimensioned in this case in such a manner that a prescribed air gap is maintained between adjacent connecting elements 6.

The connecting element 6 is in so doing likewise designed in a bracket-shaped manner. In this case, the connecting element 6 comprises the ramp-shaped inclined section 6.1 that connects the two angled ends 6.2, 6.3 to one another.

In this case, the one end 6.2 of the connecting element 6 extends downwards in an axial direction a in the assembled state of the stator 2 (cf. FIG. 6). In particular, in so doing, a side face of the end 6.2 lies against a side face of the free end of the bottom bar 4.2. The other end 6.3 of the connecting element 6 extends upwards in an axial direction a in the assembled state of the stator 2 (cf, FIG. 6). In particular, in so doing, a side face of the end 6.3 lies against a side face of the free end of the top bar 4.1.

The inclined section 6.1 extends in the assembled state of the stator 2 starting from the one end 6.2 upwards in an axial direction and in a tangential manner with respect to the circumferential direction u (cf. FIG. 6). Also in so doing, the top and bottom bars 4.1, 4.2 that are offset with respect to one another in the circumferential direction u can be electrically conductively connected to one another respectively on a shortest path possible by means of the connecting element 6 that is designed with the inclined section 6.

Figure 8:
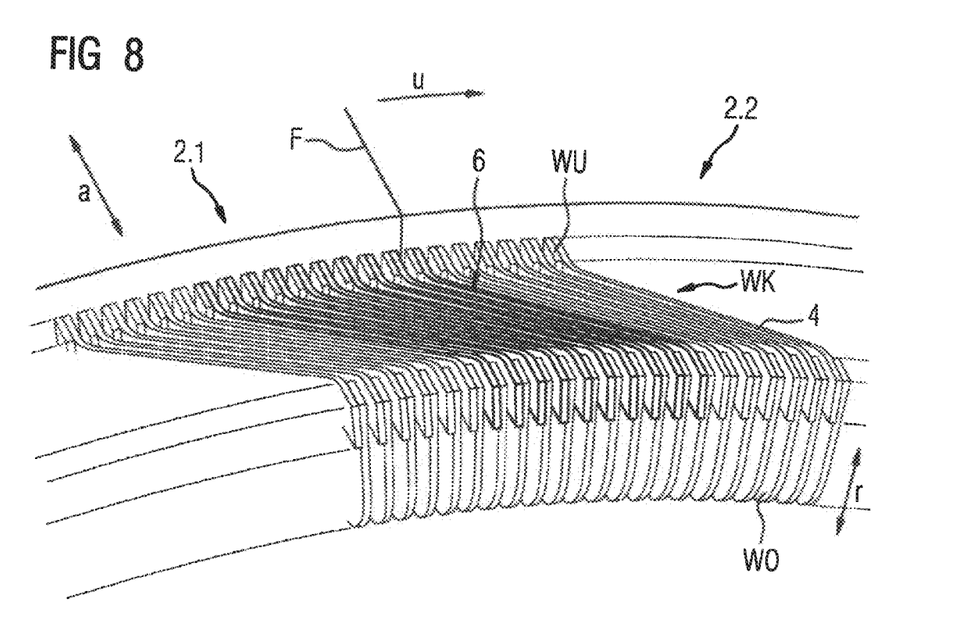
FIG. 8 shows schematically a perspective part view of two mutually connected stator segments having the double-layer bar winding in accordance with the second embodiment.

FIG. 8 shows schematically a perspective part view of two mutually connected stator segments 2.1, 2.2 having the winding 4 in accordance with the second embodiment.

The illustrated stator segments 2.1, 2.2 are connected to one another at the join site F and comprise the winding 4 that now in a similar manner to the first embodiment in addition comprises the connecting elements 6 that electrically conductively connect the top bars 4.1 of the one stator segment 2.1 to the bottom bars 4.2 of the other stator segment 2.2. These connecting elements 6 are only arranged after the stator segments 2.1, 2.2 have been assembled, in other words for example at a site where the rotating electric machine EM is used, and connected to the corresponding top and bottom bars 4.1, 4.2. Connecting sites between the connecting elements 6 and the top and bottom bars 4.1, 4.2 are electrically insulated in a known manner.

In the case of the stator 2 in accordance with the invention, the winding heads WK are designed in accordance with the first or the second embodiment. It is also feasible that one of the winding heads WK is designed in accordance with the first embodiment and the other winding head WK is designed in accordance with the second embodiment. The selection of the embodiment can be made for example depending upon the installation space and an assembly situation.

In a further alternative exemplary embodiment, the stator 2 is arranged inwards in a radial direction and the rotor is arranged outwards in a radial direction. In so doing, the grooves 5 are not provided in the inner casing surface but rather in an outer casing surface. The previously described embodiments for the winding 4 can also be applied in a similar manner for a rotating electric machine EM having a stator 2 that is arranged inwards in a radial direction, wherein the end face regions SB1, SB2 are bent inwards in a radial direction.

In a possible alternative embodiment variant of the connecting element 6, a ratio of height to width of a cross-section area of the connecting element 6 differs from a ratio of height to width of a cross-section area of the top bar 4.1 or the bottom bar 4.2, wherein the cross-section areas are approximately the same size. By means of dimensioning the cross-section area of the connecting element 6, it is possible to influence the amount of installation space required for the winding head WK in an axial direction a and a radial direction r. Furthermore, the top bars 4.1 and the bottom bars 4.2 respectively are also electrically conductively connected to one another by means of two connecting elements 6, Moreover, the connecting elements 6 can also each be designed as a triangular bracket (not illustrated).

Although the invention has been further illustrated and described in detail with the aid of preferred exemplary embodiments, the invention is not limited by the disclosed examples and other variations can be derived therefrom by the person skilled in the art without abandoning the protective scope of the invention.

What is claimed is:

1. A stator fore rotating electric machine, the stator comprising:
    a laminated core including a plurality of mutually connected stator segments which extend from a first end face to an opposite second end face of the laminated core, each of the stator segments including a plurality of grooves that extend in an axial direction;
    an electrically conductive winding designed as a double-layer bar winding, said winding including a winding top layer which comprises a plurality of electrically conductive top bars, and a winding bottom layer which comprises a plurality of electrically conductive bottom bars, said top bars and bottom bars being arranged such that each of the grooves of the stator segments receives a corresponding one of the top bars and a corresponding one of the bottom bars in adjacent relationship in a radial direction, with the top bars and the bottom bars protruding on the first and second end faces with an end face region out of the grooves in the axial direction; and
    a connecting element designed to electrically conductively connect a free end of a corresponding one of the top bars of one of the stator segments to a free end of a corresponding one of the bottom bars of an adjacent one of the stator segments, with the corresponding one of the bottom bars being offset with respect to the corresponding one of the top bars in a circumferential direction, said connecting element including two ends and an inclined section to connect the two ends to one another, with the ends being angled with respect to the inclined section, one of the two ends of the connecting element being electrically conductively connected to the free end of the corresponding one of the bottom bars and the other one of the two ends of the connecting element being electrically conductively connected to the free end of the corresponding one of the top bars.

2. The stator of claim 1, wherein the free end of the corresponding one of the top bars is spaced from the free end of the corresponding one of the bottom bars arranged offset with respect to the corresponding one of the top bars in the circumferential direction.

3. The stator of claim 1, wherein the connecting element is made of a same material as the bottom bars and/or the top bars.

4. The stator of claim 1, wherein on at least one of the first and second end faces of the laminated core the end face region of each of the top bars is designed extending in a straight line in the axial direction and the end face region of each of the bottom bars is designed as bent twice, with the free end of each of the top bars and the free end of each of the bottom bars protrude in the axial direction.

5. The stator of claim 4, wherein the plurality of top bars and the plurality of bottom bars protrude on the at least one the first and second end faces out of the grooves in the axial direction to a same extent.

6. The stator of claim 1, wherein on at least one of the first and second end faces of the laminated core the end face region of each of the top bars and the end face region of each of the bottom bars are designed bent once and the free end of each of the top bars and each of the bottom bars protrude in the radial direction.

7. The stator of claim 6, wherein the top bars protrude out of the grooves in the axial direction further than the bottom bars.

8. A rotating electric machine, comprising a stator, said stator comprising a laminated core including a plurality of mutually connected stator segments which extend from a first end face to an opposite second end face of the laminated core, each of the stator segments including a plurality of grooves that extend in an axial direction, an electrically conductive winding designed as a double-layer bar winding, said winding including a winding top layer which comprises a plurality of electrically conductive top bars, and a winding bottom layer which comprises a plurality of electrically conductive bottom bars, said top bars and bottom bars being arranged such that each of the grooves of the stator segments receives a corresponding one of the top bars and a corresponding one of the bottom bars in adjacent relationship in a radial direction, with the top bars and the bottom bars protruding on the first and second end faces with an end face region out of the grooves in the axial direction, and a connecting element designed to electrically conductively connect a free end of a corresponding one of the top bars of one of the stator segments to a free end of a corresponding one of the bottom bars of an adjacent one of the stator segments, with the corresponding one of the bottom bars being offset with respect to the corresponding one of the top bars in a circumferential direction, said connecting element including two ends and an inclined section to connect the two ends to one another, with the ends being angled with respect to the inclined section, one of the two ends of the connecting element being electrically conductively connected to the free end of the corresponding one of the bottom bars and the other one of the two ends of the connecting element being electrically conductively connected to the free end of the corresponding one of the top bars.

9. The rotating electric machine of claim 8, wherein the free end of the corresponding one of the top bars is spaced from the free end of the corresponding one of the bottom bars arranged offset with respect to the corresponding one of the top bars in the circumferential direction.

10. The rotating electric machine of claim 8, wherein the connecting element is made of a same material as the bottom bars and/or the top bars.

11. The rotating electric machine of claim 8, wherein on at least one of the first and second end faces of the laminated core the end face region of each of the top bars is designed extending in a straight line in the axial direction and the end face region of each of the bottom bars is designed as bent twice, with the free end of each of the top bars and the free end of each of the bottom bars protrude in the axial direction.

12. The rotating electric machine of claim 11, wherein the plurality of top bars and the plurality of bottom bars protrude on the at least one the first and second end faces out of the grooves in the axial direction to a same extent.

13. The rotating electric machine of claim 8, wherein on at least one of the first and second end faces of the laminated core the end face region of each of the top bars and the end face region of each of the bottom bars are designed bent once and the free end of each of the top bars and each of the bottom bars protrude in the radial direction.

14. The rotating electric machine of claim 13, wherein the top bars protrude out of the grooves in the axial direction further than the bottom bars.

\* \* \* \* \*

UNITED STATES PATENT AND TRADEMARK OFFICE
CERTIFICATE OF CORRECTION

PATENT NO. : 12,046,964 B2
APPLICATION NO. : 17/616928
DATED : July 23, 2024
INVENTOR(S) : Ilja Sabelfeld and Matthias Centner It is certified that error appears in the above-identified patent and that said Letters Patent is hereby corrected as shown below:

On the Title Page

On the second page, under item (56) U.S. PATENT DOCUMENTS:
Replace "2017/0141636 A1" with the correct -- 2017/0141635 --;

In the Claims

In Column 10, Claim 1, Line 43: replace "fore" with the correct -- for a --;

In Column 11, Claim 5, Line 28: before "the first and second .." insert -- of --.

Signed and Sealed this
Twenty-seventh Day of August, 2024

Katherine Kelly Vidal
*Director of the United States Patent and Trademark Office*